Figure 1:
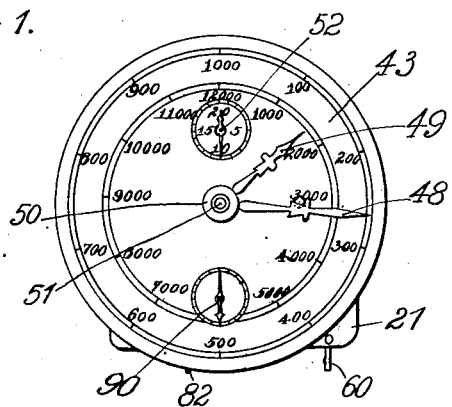

A. F. POOLE.
FREQUENCY METER.
APPLICATION FILED MAY 11, 1908.

1,003,502.

Patented Sept. 19, 1911.
4 SHEETS—SHEET 1.

Witnesses:
G. A. Paubenschmidt
John C. Michael

Inventor:
Arthur F. Poole.
By Brown & Williams
Attys

A. F. POOLE.
FREQUENCY METER.
APPLICATION FILED MAY 11, 1908.

1,003,502.

Patented Sept. 19, 1911.
4 SHEETS—SHEET 2.

Witnesses:

Inventor:
Arthur F. Poole.
By Brown & Williams
Attys

A. F. POOLE.
FREQUENCY METER.
APPLICATION FILED MAY 11, 1908.

1,003,502.

Patented Sept. 19, 1911.

4 SHEETS—SHEET 3.

Witnesses:
G. W. Paulenschmitt
John C. Michael

Inventor:
Arthur F. Poole.
By Browne & Williams
Attys.

A. F. POOLE.
FREQUENCY METER.
APPLICATION FILED MAY 11, 1908.
1,003,502.
Patented Sept. 19, 1911.
4 SHEETS—SHEET 4.
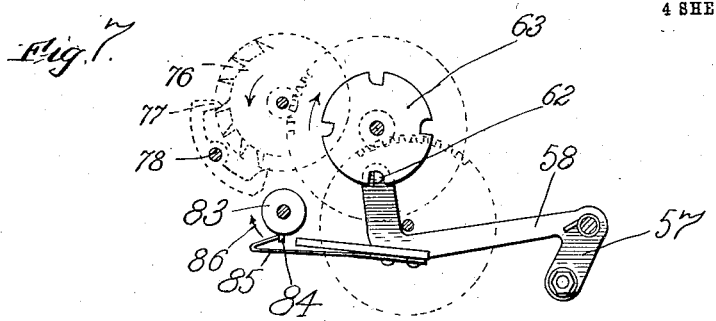
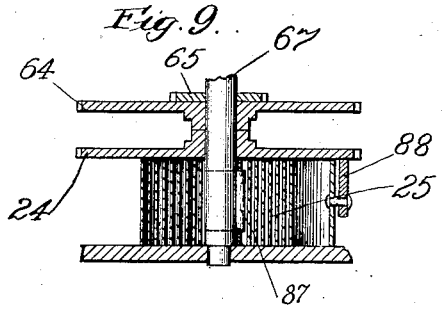
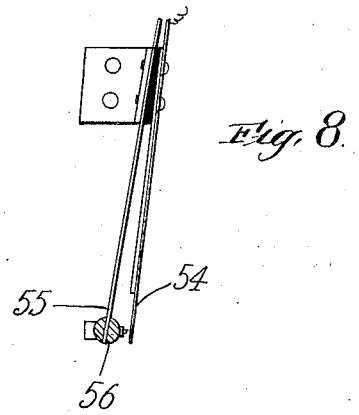
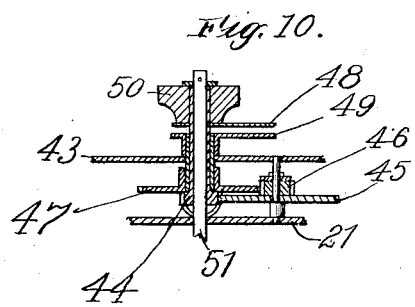
Witnesses:
G. A. Paulerschmidt
John C. Michael
Inventor:
Arthur F. Poole.
By Brown & Williams
Attys.

UNITED STATES PATENT OFFICE.

ARTHUR F. POOLE, OF CHICAGO, ILLINOIS.

FREQUENCY-METER.

1,003,502.  Specification of Letters Patent.  Patented Sept. 19, 1911.

Application filed May 11, 1908. Serial No. 432,284.

*To all whom it may concern:*

Be it known that I, ARTHUR F. POOLE, a citizen of the United States, residing at Chicago, in the county of Cook and State of Illinois, have invented a certain new and useful Improvement in Frequency-Meters, of which the following is a full, clear, concise, and exact description, reference being had to the accompanying drawings, forming a part of this specification.

My invention relates to frequency meters intended for measuring the periodicity of alternating or pulsating currents of electricity.

Generally speaking, my present invention may be described as an improvement on a frequency meter of my invention for which I have already applied for United States Letters Patent in an application, Serial No. 406,594, filed December 16, 1907.

In the application referred to, I disclosed and claimed a frequency meter comprising a clock train driving suitable hands or pointers and having an escapement controlled by a polarized electromagnet. The electromagnet of that frequency meter was intended to be connected with the source of alternating or pulsating electric current, whose frequency was to be measured. Each pulsation of current flowing through the electromagnet caused the one step actuation of the escapement controlled by the electromagnet. By connecting the electromagnet for a given period, as for example one minute, with the source of current to be measured, the number of reversals could be ascertained by noting the amount of rotation of the clock hands in that period of time.

One of the important features of my former invention was the fact that the polarization of the armature of the electromagnet caused the armature to stand in whatever position it might find itself. A very slight weakening of the polarization, due to flow of current in the proper direction, would cause the armature to be released, whereby the driving spring or weight of the clock would force the one step advancement of the escapement wheel. Since the spring of the clock train tended to cause the rotation of the escapement wheel, and thus the vibration of the armature of the electromagnet, it required only a very slight weakening of the polarization of the electromagnet to permit the one step advancement of the clock train. As a result of this arrangement, the frequency meter of this former application was capable of responding accurately to alternating currents of widely variant and very high frequencies.

One of the difficulties involved in the use of this frequency meter of my former application is that the operator is required to exercise some considerable care to connect the electromagnet of the meter for an exact period of time with the source of current. It is incumbent upon the operator, furthermore, to control the duration of this connection with a stop watch or in some other way which shall insure reasonable accuracy. Although very accurate results can be secured by the use of the frequency meter of my former application, it is necessary for this purpose to minimize the probable errors in starting and stopping the operation by continuing the operation for a considerable period of time. If the meter is run for five minutes, any slight error in starting and stopping will not have a very large effect upon the result obtained in calculating from the reading the number of reversals per minute or second. The errors of starting and stopping would, however, be considerable if the operation were continued for but a few seconds.

It is the object of my present invention to overcome these defects and to provide a frequency meter in which the starting and stopping of the counting mechanism shall be automatically controlled by a timing clock movement. I am enabled thereby to cut down the length of time for which the operation must be continued, in order that accurate results may be secured. Furthermore, my present invention relieves the operator of the necessity for timing the duration of the operation.

Figure 2:
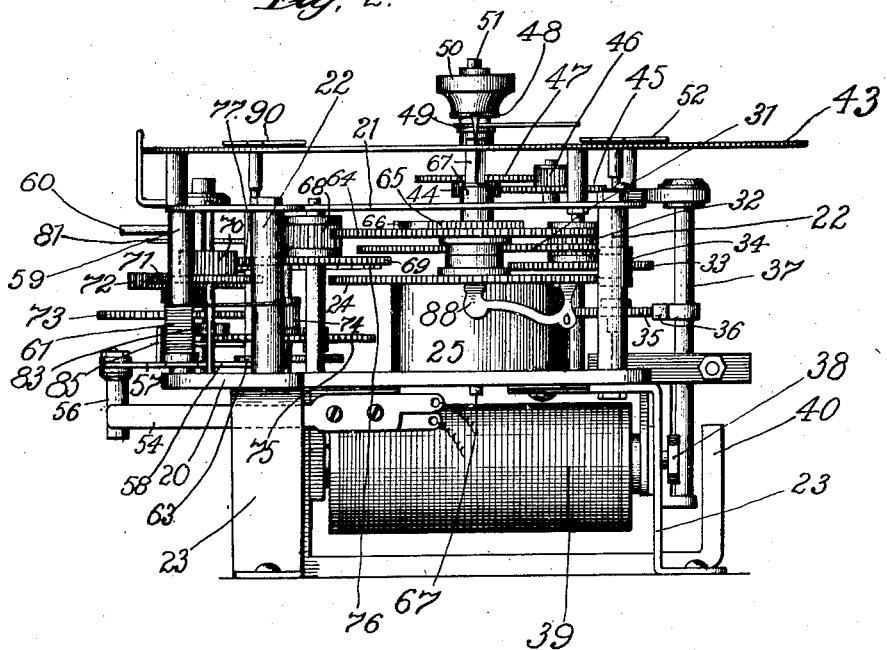
Figure 3:
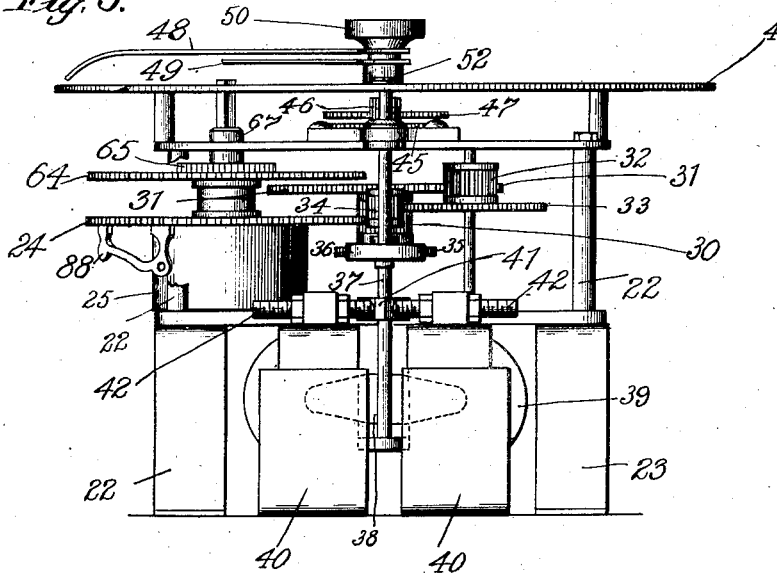
Figure 6:
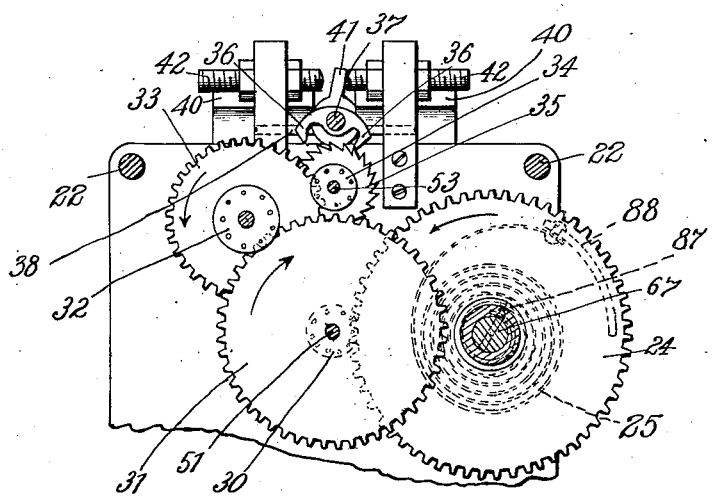
Figure 5:
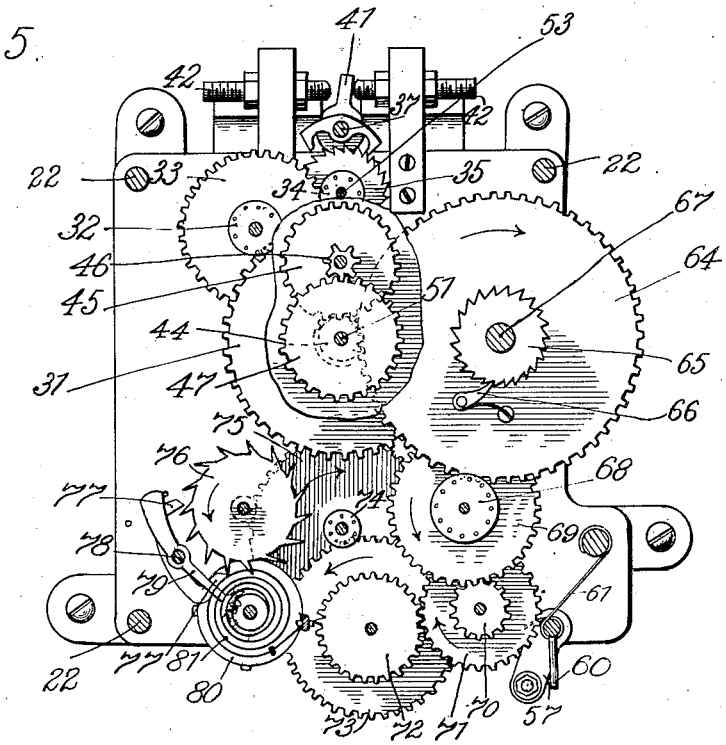
Figure 4:
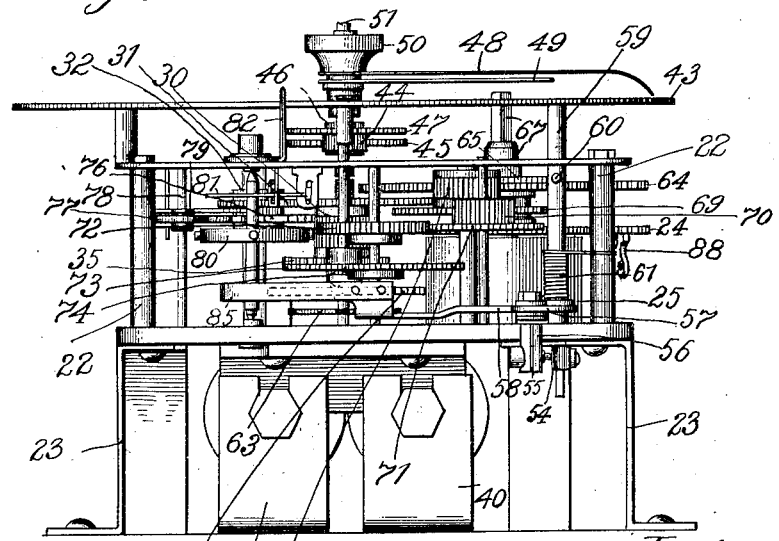

In order to attain these objects and results, my present invention contemplates a clock train whose escapement is controlled by an electromagnet connected in the circuit whose frequency is to be measured. Each reversal of the current causes the one step advancement of this gear train. The hands or indicating pointers connected with this train serve, therefore, to show upon a suitable dial the number of reversals of current which have taken place in the electromagnet. Associated with this mechanism is a second clock train provided with a detent or stop mechanism. A small lever or starting button is provided for the use of the operator, and when tripped, this timing clock train will be set in operation and will continue for a predetermined length of time, as for example fifteen seconds. This timing clock train is provided with a cam or other mechanism for throwing the detent mechanism at the termination of the predetermined time interval. A lock switch is included in the circuit of the electromagnet and the switch is controlled by the mechanism for starting and stopping the time clock movement. When the operator releases the detent this switch is automatically closed and will remain closed until the detent mechanism operates to stop the timing clock train, whereupon the switch is opened. Thus I insure the closure of the circuit of the controlling electromagnet of the counting train for an exactly predetermined interval of time. In utilizing this frequency meter, therefore, the operator has simply to connect the terminals of the frequency meter circuit with the source of current to be measured. He thereupon actuates the controlling lever of the detent mechanism, thereby causing the closure of the circuit of the electromagnet for a known period of time. The operator need not concern himself with the opening of the circuit of the electromagnet at the termination of the period since this is automatically accomplished by the timing train. The indications of the hands or pointers may thereupon be taken as indicative of the number of reversals which have taken place during the period of time for which the timing clock mechanism is adjusted to maintain the closure of the circuit of the electromagnet. For the sake of simplicity, cheapness in manufacture and for compactness and general convenience, I have arranged the two gear trains of this meter to be driven by a common driving spring, one end of the driving spring being connected with the main gear of one train and the other end being connected with the main gear of the other train. These and other features of my invention will more fully appear from a consideration of the accompanying drawings, in which:

Figure 1 is a general front elevation of the apparatus of my invention; Fig. 2 is a side elevation of the same; Fig. 3 is a top, or plan view; Fig. 4 is a view looking upward from the lower side of the instrument; Fig. 5 is a front view with the dial removed and certain of the parts broken away or shown in cross-section; Fig. 6 is a plan view of the counting train and escapement; Fig. 7 is a detail view of the detent mechanism; Fig. 8 shows in detail the electrical contact or switch mechanism; Fig. 9 is a cross sectional detail view of the driving spring and the main gears connected therewith, and Fig. 10 is a cross-sectional detail view of the mechanism for driving the hands and for resetting them.

Like characters of reference are applied to corresponding parts in all of the drawings.

In many respects, the preferred embodiment of my invention follows the plan of construction which has been adopted in clock work. The top and bottom plates 20 and 21 form bearings and supports for the mechanism, these plates being separated by the pillars 22, 22 in the usual manner. The supporting legs 23, 23 may be attached to a suitable base plate, thus supporting the mechanism in a convenient position for operation.

The counting train comprises the main gear 24, which is driven by the main spring 25. The main gear 24 drives a pinion 30. This pinion is connected with an intermediate gear 31, which in turn meshes with a pinion 32. This pinion acting upon the gear 33 serves to drive the pinion 34, to which the escapement wheel 35 is connected. The pallets 36, 36 of the escapement mechanism are mounted upon a spindle 37. This spindle carries also the armature 38 of the electromagnets 39, the electromagnetic mechanism being polarized by the permanent magnets 40, 40. The lug 41 is also attached to the spindle 37, and coöperates with the adjustable stop screws 42, 42, to limit the oscillation of the armature and consequently that of the pallets 36, 36.

The polarization effected by means of the permanent magnets 40, 40 is sufficient to cause the armature to strike in whichever position it may be. When, however, a current impulse flows through the electromagnets 39 in such a direction as to weaken the magnetization, the pallets of the escapement are thrown into their alternate position, thus causing the one step advancement of the counting train. Consequently, when the electromagnets are connected with a source of alternating current, the oscillation of the armature controls the escapement mechanism and hence the advancement of the counting train.

In order that the number of oscillations may be read from the dial 43, the counting train is connected through the gears 44, 45, 46 and 47 with the hands 48 and 49. The rear head 50 enables the operator to turn the hands to their zero position without affecting the counting train, as the hand driving gearing has merely a frictional engagement with the spindle 51 of the intermediate gear 30. A small hand 52 is mounted upon the end of the spindle 53 of the escapement wheel 35, this hand appearing upon the face of the dial 43, as indicated. The gear ratios are such that the number of reversals of an alternating current passing through the electromagnets 39, 39 may be read from the face of the dial.

We come now to the mechanism for controlling the closure of the circuit through the electromagnets. In principle, this consists in a normally opened switch, the contacts of which are manually operated to close the circuit through the electromagnets. Upon the closure of this circuit, a timing clock train is set in motion, this train serving, after the elapse of a predetermined period of time, to open the circuit of the electromagnets. The switch contacts are shown at 54 and 55, and are connected serially in circuit with the electromagnets 39, 39. The movable switch spring 55 is provided at its outer end with a stud-like connection 56 with an arm 57 of the detent lever 58. This lever is carried by a pivoted spindle 59, to which is attached the trigger 60. A spiral spring 61 tends to rotate the lever 58 and its arm 57 in such a direction as to open the contacts of the switch springs 54 and 55. When, however, the operator presses the trigger 60 as shown in Fig. 4, toward the right, these contacts will be closed. The detent lever is provided with a pin 62 which rests normally in one of the notches in the periphery of the cam wheel 63, this cam wheel being connected with the timing gear train, which I shall more fully describe. Suffice it now to say that when the trigger is actuated the pin 62 is drawn from the notch in the cam wheel 63, and the rotation of the cam wheel is commenced. When, therefore, the pressure of the finger is removed from the trigger, the pin 62 will ride upon the periphery of the wheel 63, thus maintaining the closure of the switch springs 54 and 55 until another notch in the periphery of the cam wheel 63 is reached, when the pin 62 will drop into the normal position in which the switch contact springs will be opened. The gear ratios and adjustments are so made that an exact, predetermined period of time will elapse between the tripping of the detent lever and the subsequent opening of the contact springs. In the preferred embodiment of my invention shown in these drawings, the mechanism is arranged to permit the closure of the electromagnet circuit for a period of fifteen seconds, upon the tripping of the detent mechanism.

The timing gear train with which the cam 63 is connected, comprises a main driving gear 64 which is driven by the ratchet 65 and the pawl 66 from the winding spindle 67 and a series of intermediate pinions and gears. The pinion 68 is driven by the main gear 64 and rotates with the gear 69, which meshes with the pinion 70. The pinion 70 rotates with the gear wheel 71 which is in mesh with the gear 72, this gear being connected in turn with the gear 73 which is in mesh with the pinion 74. This latter pinion carries upon its spindle the gear 75, which drives the spindle of the escapement wheel 76. The step by step advancement of the escapement wheel is controlled by the pallets 77, 77 mounted upon the rocking spindle 78, with which the lever 79 is connected. This lever is actuated from the staff of the balance wheel 80, the hairspring 81 being connected with the balance wheel staff and the frame in a manner well known to those skilled in the art. The adjustment of the balance wheel spring, and consequently of the speed of operation of the timing gear train, is effected by means of the fast and slow lever 82. At the lower end of the balance wheel staff there is a small detent disk 83, whose periphery is provided with a catch pin 84. The end of the detent lever 58 is provided with a catch spring 85. The catch spring 85 engages the pin 84 as best illustrated in Fig. 7, in a manner such that the tendency of the disk 83 is to rotate in the direction indicated by the arrow 86. When the trigger is pressed to release the timing mechanism and to close the circuit of the electromagnets 39, 39, the catch spring 85 is withdrawn from its normal position shown in Fig. 7, thereby releasing the balance wheel, which commences its movement by a stroke in the direction of the arrow 86.

As soon as the cam wheel 63 has rotated slightly, the pin 62 will be engaged by the periphery of the cam wheel to hold the catch spring 85 out of the line of movement of the pin 84. The oscillation of the balance wheel will therefore continue until the pin 62 drops into one of the notches in the periphery of the cam wheel 83. Thereupon the pin 84 will be engaged and retained by the spring 85 upon the first movement in the direction of the arrow 86. The position of the pin 84 and the catch spring 85 are made such that the balance wheel will be stopped after the movement in the direction of the arrow 86 has continued for but a very slight distance. The result is that whenever the detent lever is actuated to set the timing train in motion, the balance wheel will be found in a position such that its oscillation will commence promptly, and with substantially the full, normal stroke. If it were not for the provision of this detent or catch mechanism associated with the balance wheel, in other words, if the pin 62 and the cam 63 were alone depended upon to detain the timing train, the mechanism might not always be stopped at the end of a given number of strokes. Furthermore, and of perhaps greater importance, the balance wheel might not be stopped in a position such that its oscillation would begin promptly and with the normal stroke, immediately upon the actuation of the trigger of the detent mechanism. Such an uncertain and irregular oscillation of the balance wheel mechanism would cause variations in the length of time for which the switch contacts 54 and 55 are maintained in their closed condition. All of these difficulties are overcome by the catch mechanism associated with the balance wheel staff in the manner described.

The manner in which the single driving spring 25 is connected to drive both gear trains is best illustrated in the cross sectional view of Fig. 9. The inner end of the spring is fastened to a catch 87 in the winding shaft 67. The outer end of the spring is attached directly to the main driving gear 24 by means of the bracket 88, the gear 24 being loosely mounted upon the shaft 67. The ratchet wheel 65 is secured to the winding shaft 67, and serves by means of the pawl 66 to rotate the gear 64 and at the same time to permit the main spring to be rewound in the usual manner. It will be seen, therefore, that the single main spring tends to rotate one of the main gears in one direction and the other in the reverse direction. Whenever either gear train is released, the spring will cause its rotation. The second hand 90 is connected with the timing train to indicate the rotation thereof.

While I have herein shown and described a preferred embodiment of my invention, it will be apparent to those skilled in the art that many modifications can be made without departing from the spirit thereof. I do not wish, therefore, to be limited to the precise details of this disclosure.

What I claim as new and desire to secure by Letters Patent is:

1. In a frequency meter, the combination of counting mechanism, means tending to drive said counting mechanism, polarized electromagnetic mechanism for coöperating with said driving means to effect the operation of said counting mechanism, and means associated therewith for automatically determining the period of time during which the operation of the counting mechanism continues.

2. In a device of the class described, the combination with counting mechanism, of means tending to drive said counting mechanism, a polarized electromagnet for coöperating with said driving means to jointly effect the operation of said counting mechanism, a switch in the circuit of the electromagnet, and a clock train for controlling said switch.

3. In combination, counting mechanism, means tending to drive said counting mechanism, polarized electromagnetic mechanism for coöperating with said driving means to jointly effect the operation of said counting mechanism, means for closing the circuit of said electromagnetic mechanism, and means for automatically opening said circuit at the termination of a predetermined period of time.

4. In combination, counting mechanism, means tending to drive said counting mechanism, polarized electromagnetic mechanism for coöperating with said driving means to jointly effect the operation of said counting mechanism, a switch in circuit with said electromagnetic mechanism, detent mechanism for maintaining the closure of the switch, and a clock train for opening said switch after the elapse of a predetermined period of time.

5. In combination, counting mechanism, means tending to drive said counting mechanism, polarized electromagnetic mechanism for coöperating with said driving means for jointly effecting the operation of said counting mechanism, a switch in circuit with said electromagnetic mechanism, detent mechanism for maintaining the closure of said switch, a clock train for automatically releasing the detent mechanism thereby to open the switch after a predetermined degree of actuation of the clock train, and automatic means for releasing the clock train for operation upon the closure of said switch.

6. In combination, counting mechanism, means tending to drive said counting mechanism, polarized electromagnetic mechanism for coöperation with said driving means to jointly effect the operation of said counting mechanism, a switch in circuit with said electromagnetic mechanism, a clock train, detent mechanism serving normally to restrain said clock train against operation, the closure of said switch being controlled by said detent mechanism whereby the actuation of said detent mechanism to close the switch releases the clock train, and means for causing said detent mechanism to engage the clock train to stop its operation after the elapse of a predetermined period of time.

7. In a device of the class described, a polarized electromagnet, a counting train, means tending to drive said counting train, said driving means and said electromagnet operating jointly to effect the operation of said counting train, a switch in the circuit of the electromagnet, means for closing said switch, and time controlled means for opening said circuit at the termination of a predetermined period of time.

8. In a device of the class described, the combination of driving means, an escapement therefor, electromagnetic mechanism for controlling said escapement, means for indicating the movement of said escapement, a switch in the circuit of said electromagnetic mechanism, a timing clock train, an escapement and balance wheel therefor, detent mechanism for restraining the movement of the timing clock train at predetermined points, auxiliary catch mechanism associated with the detent mechanism for restraining the balance wheel at or near one end of its stroke, and means for closing said switch upon the actuation of the detent mechanism to release the timing clock train.

9. In combination, a counting train, an electromagnet for controlling the escapement thereof, a normally open switch in the circuit of the electromagnet, a timing clock train always under tension, a cam operated thereby, detent mechanism for engaging said cam to stop the timing clock mechanism at predetermined points, and means for automatically closing said switch upon the actuation of said detent mechanism to release the timing clock train.

10. In combination, a counting train, an electromagnet for controlling the escapement thereof, a normally open switch in the circuit of the electromagnet, a timing clock train, a cam operated thereby, detent mechanism for engaging said cam to stop the timing clock mechanism at predetermined points, means for automatically closing said switch upon the actuation of said detent mechanism to release the timing clock train, and a common main spring for driving the counting train and the timing clock train.

11. In a device of the class described, the combination of a counting train, an electromagnet for controlling the operation thereof, a normally open switch in circuit with said electromagnet, a timing clock train having an escapement and balance wheel, a cam associated with the timing clock train, detent mechanism coöperating with said cam to stop the timing clock train at predetermined points, auxiliary catch mechanism associated with said detent mechanism and the balance wheel to hold the balance wheel at or near a given point in its stroke when the timing clock train is restrained against operation, means associated with the detent mechanism to close said switch when the detent mechanism is actuated to release the timing clock train, and a common main spring for driving the counting train and the timing clock train.

12. In a frequency meter, in combination, driving means, and an escapement therefor, electromagnetic means for controlling said escapement, means for indicating the movement of said escapement, a switch for controlling the circuit of said electromagnetic mechanism, a timing mechanism including a balance wheel, and manually operated means and separate automatic means directly and simultaneously controlling said balance wheel and said switch.

13. In a frequency meter, in combination, electromagnetic counting mechanism, a timing clock train including a balance wheel, a cam operated by said clock train, a switch controlling the circuit of said electromagnetic counting mechanism, a detent member mechanically connected with said switch and normally detaining said cam and said balance wheel, means for manually operating said detent member to close said switch and release said cam and said balance wheel, and automatic means for opening said switch and catching said balance wheel.

14. In a frequency meter, in combination, electromagnetic counting mechanism, a timing clock train including a balance wheel, a cam operated by said clock train, a switch controlling the circuit of said electromagnetic counting mechanism, a detent member mechanically connected with said switch and normally detaining said cam and said balance wheel, and means for manually operating said detent member to close said switch and release said cam and said balance wheel, said detent member automatically engaging said cam so as to arrest the same after a predetermined length of time and also to catch and detain said balance wheel.

In witness whereof, I hereunto subscribe my name this 21st day of April, A. D. 1908.

ARTHUR F. POOLE.

Witnesses:
LYNN A. WILLIAMS,
LEONARD W. NOVANDER.